3,240,811
SELECTED FLUORINATED ACYLOINS AND
1,2-DIKETONES AND THEIR PREPARATION
John J. Drysdale, Wilmington, Del., assignor to E. I. du
Pont de Nemours and Company, Wilmington, Del., a
corporation of Delaware
No Drawing. Filed Sept. 6, 1961, Ser. No. 136,202
8 Claims. (Cl. 260—593)

This application is a continuation-in-part of my copending application Serial No. 825,631, filed June 19, 1959, and now U.S. Patent 3,012,069.

This invention relates to, and has as its principal objects provision of, new polyfluorinated acyloins and 1,2-diketones and a process for the preparation of the new 1,2-diketones.

In the above-mentioned U.S. Patent 3,012,069, the reaction of polyfluoroacyl halides with nickel carbonyl in the presence of benzonitrile at temperatures below 40° C. is shown to result uniquely in the formation of polyfluorocarbyl acyloin esters and enediol diesters. It is also shown that the polyfluorocarbyl acyloin esters and enediol diesters are intermediates to corresponding acyloins and 1,2-diketones. These two last-mentioned groups of compounds are the compounds of this invention.

The present novel compounds can be described by the general formula

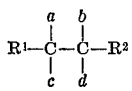

in which $R^1$ and $R^2$ are perfluoro-, ω-hydroperfluoro, or ω-chloroperfluorocarbyl radicals of 3–14 carbons free of aliphatic unsaturation; valences $a$ and $c$ are satisfied jointly by a double bond attached to oxygen; and valences $b$ and $d$ are satisfied separately by hydrogen and hydroxyl, respectively, or jointly by a double bond attached to oxygen. In the special case in which each pair of valences $a$–$c$ and $b$–$d$ is satisfied jointly by a double bond attached to oxygen, i.e., when the compound is a 1,2-diketone, the general formula can be written

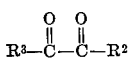

in which $R^2$ is the same as before and $R^3$ is the same as $R^1$ or may also be an α-hydroperfluoro-, α,ω-dihydroperfluoro-, or α-hydro-ω-chloroperfluorocarbyl radical of 3–14 carbons free of aliphatic unsaturation. In all cases, the (-)perfluorocarbyl radical is preferably (-)perfluoroalkyl.

In my above-mentioned patent it is shown that the polyfluorocarbyl enediol diesters of that application can be directly converted to corresponding polyfluorocarbyl 1,2-diketones by pyrolysis:

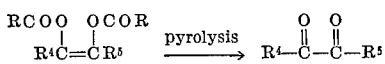

where R, $R^4$ and $R^5$ are perfluoro-, ω-hydroperfluoro- or ω-chloroperfluorocarbyl radicals, (-)perfluorocarbyl again perferably being (-)perfluoroalkyl. Generally the pyrolysis will be carried out at temperatures in the range 400–700° C., using conventional pyrolysis equipment, perferably with a common type of packing in the pyrolysis tube.

It is also shown in U.S. Patent 3,012,069 that the polyfluorocarbyl acyloin esters and enediol diesters described therein can be directly converted to the acyloins of this invention by simple alcoholysis. In addition, the polyfluorocarbyl acyloins can be directly oxidized to corresponding 1,2-diketones of this invention.

The ready and direct conversion of the polyfluorocarbyl acyloin esters and enediol esters of U.S. Patent 3,012,069 to corresponding acyloins and 1,2-diketones has fundamental technical significance, in that previous attempts to prepare polyfluorosubstituted acyloins and 1,2-diketones have failed. Thus, Haszeldine, Nature, 168, 1028 (1951), and McBee et al., J. Am. Chem. Soc. 75, 4091 (1953), show that the reaction of sodium on ethyl trifluoroacetate forms trifluoroacetoacetic ester and trifluoroethanol, and not the expected acyloin, $CF_3CHOHCOCF_3$ or 1,2-diketone, $CF_3COCOCF_3$. From these teachings, one would not expect the polyfluorinated acyloins or 1,2-diketones shown herein to be formed at all or, if formed, to be formed so readily.

The following nonlimiting examples are submitted to illustrate further the present invention. In these examples, unless otherwise indicated all pressures are ambient atmospheric and all parts are by weight.

Example I

A mixture of 73 parts of methanol and 600 parts of the enediol diester perfluoro-4-octene-4,5-diol di(perfluorobutyrate) (see Examples III and IV of U.S. Patent 3,012,069) was stirred at 25° C. As solution took place, an exothermic reaction occurred which heated the reaction mixture to reflux temperature. Upon distillation of the reaction product, there was obtained 270 parts of a mixture of methanol and methyl perfluorobutyrate boiling at less than 70° C. under a pressure corresponding to 90 mm. of mercury and 272 parts (90% of theory) of the polyfluoroacyloin 5H-tetradecafluoro-5-hydroxy-4-octanone as a clear, colorless liquid boiling at 70–72° C. under a pressure corresponding to 90 mm. of mercury; $n_D^{25}$, 1.4940. Infrared analysis showed carbonyl absorption at 5.67 microns and hydroxyl absorption at 2.80 microns.

Analysis.—Calc'd for $C_8F_{14}H_2O_2$: F, 67.2%. Found: F, 66.8%.

Example II

A mixture of 15 parts of methanol and 91 parts of the enediol diester 1H,10H-hexadecafluoro-5-decene-5,6-diol di(5H-perfluorovalerate) (see Example I of U.S. Patent 3,012,069) was stirred at room temperature for 15 minutes. Distillation of the resultant mixture afforded methyl 5H-perfluorovalerate and 45.5 parts (100% of theory) of the polyfluoroacyloin 1H,6H,10H-hexadecafluoro-6-hydroxy-5-decanone as a clear, colorless liquid boiling at 74–76° C. under a pressure corresponding to 50 mm. of mercury. Infrared analysis showed carbonyl and hydroxyl absorption.

Analysis.—Calc'd for $C_{10}H_4F_{16}O_2$: C, 26.1%; H, 0.9%; F, 66.1%. Found: C, 26.4%; H, 1.0%; F, 66.0%.

Example III

A mixture of 232 parts of perfluorobutyryl chloride, 264 parts of 5H-octafluorovaleroyl chloride, 100 parts of nickel carbonyl, and 100 parts of benzonitrile was stirred at room temperature for 72 hours under anhydrous conditions. An additional 70 parts of nickel carbonyl was then added, and stirring was continued for an additional week. The reaction mixture was filtered, and the filter cake was washed with diethyl ether. The ether wash was concentrated, and the ether concentrate and filtrate were combined and distilled. The liquid product, boiling at 93° C. under a pressure corresponding to 24 mm. of mercury, was stirred with excess methanol for 15 minutes. Upon distillation of the resultant reaction mixture, there was obtained the polyfluoroacyloins: (a) 5H-tetradecafluoro-5-hydroxy-4-octanone (see Example I) boiling at 70–72° C. under a pressure corresponding to 90 mm. of mercury; (b) 1H,6H,10H-hexadecafluoro-6-hydroxy-5-decanone (see Example II) boiling at 74–76° C. under a pressure corresponding to 50 mm. of mercury; and (c) 50 parts of a mixture of 1H,5H-pentadecafluoro-5-hydroxy-6-nonanone and 4H,9H-pentadecafluoro-4-hydroxy-5-nonanone as a clear, colorless liquid boiling at 87° C. under a pressure corresponding to 40 mm. of mercury. Infrared analysis showed carbonyl absorption and hydroxyl absorption. It was not possible to separate the isomers of fraction (c) by distillation.

*Analysis.*—Calc'd for $C_9H_3F_{15}O_2$: C, 25.2%; H, 0.8%; F, 66.6%. Found: C, 25.7%; H, 1.0%; F, 66.1%.

Example IV

A cylindrical glass reactor fabricated from a commercially available high silica glass sold under the trade name "Vycor," approximately 16 diameters long, was packed with tubular sections of the same type of glass approximately one-third the reactor diameter in both width and length. The reactor, attached to solid carbon dioxide/acetone- and liquid nitrogen-cooled traps connected in series, was heated to 600° C. The entire reaction system was then pumped down to a pressure corresponding to about 5 mm. of mercury and 7.5 parts of perfluoro-4-octene-4,5-diol diperfluorobutyrate (see Examples III and IV of U.S. Patent 3,012,069) was dropped into the heated reaction zone over a period of 5 minutes. The resultant pyrolysis product (collected in both traps) was combined and distilled from phosphorous pentoxide through a spinning band column of the type described in U.S. Patent 2,712,520. There was thus obtained a total of 0.9 part of products boiling at 92–95° C. Nuclear magnetic resonance spectra and gas chromatographic analyses indicated that the fraction, 0.45 part, boiling at 95° C. at atmospheric pressure was 90–95% pure perfluoro-4,5-octanedione, with the major impurity being the shorter chain monoketone perfluoro-4-heptanone. Infrared analysis showed strong carbonyl absorption at 5.65 microns. Approximately one-third of the 95% pure product was further purified by gas chromatography for elemental analysis.

*Analysis.*—Calc'd for $C_8F_{14}O_2$: F, 67.5%. Found: F, 67.4%.

The perfluoro-4,5-octanedione was further characterized by conversion to 2,3-bis(perfluoropropyl)quinoxaline. Thus, 0.25 part of o-phenylenediamine was added to 0.88 part of the above perfluoro-4,5-octanedione. A vigorous reaction ensued. The resultant liquid product was heated with 5.4 parts of acetic anhydride for one hour, 7.9 parts of ethanol was then added, and the resultant mixture was heated at steam bath temperature for 15 minutes. Approximately 20 parts of water was then added, and the lower layer of the resultant mixture was collected and distilled. There was thus obtained 2,3-bis(perfluoropropyl)quinoxaline as a clear, colorless liquid boiling at 75° C. under a pressure corresponding to 3 mm. of mercury; $n_D^{25}$, 1.4195. The nuclear magnetic resonance spectrum showed a $C_3F_7$— grouping and aromatic hydrogen. The ultraviolet spectrum showed absorption at 3200 and 2425 A.

*Analysis.*—Calc'd for $C_{14}H_4F_{14}N_2$: F, 57.0%. Found: F, 57.1%.

Example V

A stillpot was charged with 100 parts of the acyloin 5H-tetradecafluoro-5-hydroxy-4-octanone (see Example I), 210 parts of acetic acid, and 66 parts of bismuth triacetate. The pot was connected to a spinning band distillation column of the type described in U.S. Patent 2,712,520, and distillation was begun. About 60 parts of product boiling in the range 90–115° C. at atmospheric pressure was collected. Upon redistillation, there was obtained 30 parts of a yellow liquid boiling at 96° C. at atmospheric pressure which, by gas chromatography, was shown to be an azeotrope of acetic acid and perfluoro-4,5-octanedione (see Example IV). The pure perfluoro-4,5-octanedione was recovered from the azeotrope by shaking with water and distilling the resultant perfluoro-4,5-octanedione hydrate from phosphorus pentoxide.

Continued distillation of the original distillation residue afforded 20 parts of a mixture of acetic acid and 3H-tridecafluoro-4,5-octanedione as a yellow liquid boiling at 108–110° C. at atmospheric pressure. Gas chromatography afforded the pure 3H-tridecafluoro-4,5-octanedione as indicated by nuclear magnetic resonance analysis.

The identity of the 3H-tridecafluoro-4,5-octanedione was further established by conversion to 2-perfluoropropyl-3-(1H-hexafluoropropyl)quinoxaline. Thus, 3 parts of the above 3H-tridecafluoro-4,5-octanedione was added to 0.9 part of o-phenylenediamine. The reaction mixture was gently heated over an open flame, and water was then added. The resultant crystalline solid was isolated and sublimed at a pressure corresponding to 100 mm. of mercury to obtain the pure 2-perfluoropropyl-3-(1H-hexafluoropropyl)quinoxaline as plates melting at 42–43° C.

*Analysis.*—Calc'd for for $C_{14}H_5N_2F_{13}$: C, 37.5%; H, 1.1%; F, 55.1%. Found: C, 37.8%; H, 1.5%; F. 55.0%.

Example VI

A mixture of 14 parts of the acyloin 1H,6H,10H-hexadecafluoro-6-hydroxy-5-decanone (see Example II), 8 parts of bismuth triacetate, and 52.5 parts of acetic acid was heated to 110° C. and allowed to cool. Upon distillation of the reaction mixture, there was thus obtained 1.9 parts of an 80%/20% mixture of 1H,10H-hexadecafluoro-5,6-decanedione and 1H,4H,10H-pentadecafluoro-5,6-decanedione as a clear, colorless liquid boiling at 56–65% C. under a pressure corresponding to 15 mm. of mercury. Continued distillation afforded 3.6 parts of substantially pure 1H,4H,10H-pentadecafluoro-5,6-decanedione as a clear, colorless liquid boiling at 76° C. under a pressure corresponding to 15 mm. of mercury. The 80/20 mixture of the two decanediones and the substantially pure 1H,4H,10H-pentadecafluoro-5,6-decandione were characterized by fluorine nuclear magnetic resonance analysis.

As is apparent from the foregoing examples, the present invention is generic to acyloins of the structure:

and to 1,2-diketones of the structure $R^3COCOR^2$, all of which are obtainable variously from the acyloin esters and enediol diesters described in U.S. Patent 3,012,069.

The alcoholysis reaction by which the acyloins are obtained is straightforward and simple. The polyfluorinated acyloin or polyfluorinated enediol diester is simply brought into contact with an alcohol, e.g., methanol, ethanol, butyl alcohol, and the like. The reaction mixture is stirred and, generally after a short induction period, an exothermic reaction occurs. Reaction times can vary from as short as 15 minutes to several hours. The reaction mixture need not be heated, but if desired, external heat can be applied to accomplish the alcoholysis in shorter time. Examples of the new polyfluorinated acyloins of the present invention, in addition to those already illustrated in detail, include the following: 7H-docosafluoro-7-hydroxy-6-dodecanone, 1H,12H,22H-tetracontafluoro-12-hydroxy-11-docosanone, 1,10 - dichlorohexadecafluoro - 6-hydroxy-5-decanone, 16H - hexapentacontafluoro-16-hydroxy-15-triacontanone and dibutyl 6H - dodecafluoro - 6 - hydroxy-5-ketosebacate.

These polyfluorinated acyloins can be oxidized directly to the polyfluorosubstituted 1,2-diketones. Suitable oxidation techniques involve bismuth triacetate, for example, at temperatures from 50–150° C. or higher. Other conventional organic oxidizing agents, or, for that matter, oxygen itself either alone or in the presence of oxidation catalysts, at ambient or elevated temperatures can serve to effect the oxidation. These same polyfluorinated 1,2-diketones can also be prepared directly from the previously mentioned perfluorosubstituted enediol diesters by simple pyrolysis. Generally the pyrolysis will be carried out at temperatures in the range 400–700° C. or thereabouts, using conventional pyrolysis equipment, preferably with the normal type packings in the pyrolysis tube. Suitable specific examples of these new polyfluorinated 1,2 - diketones include: perfluoro - 6,7 - dodecanedione, 1H,22H-tetracontafluoro - 11,12-docosanedione, 1,10-dichlorohexadecafluoro - 5,6-decanedione, 1H,30H-hexapentacontafluoro - 15,16 - triacontanedione, 5H-heneicosafluoro-6,7-dodecanedione, 1H,10H,22H - nonatriacontafluoro - 1,11,12-docosanedione, 4H-1,10 - dichloropentadecafluoro - 5,6-decanedione, 1H,14H,30H - pentapentacontafluoro-15,16-triacontadione and diethyl hexadecafluoro - 6,7-diketododecane-1,12-dioate.

These various polyfluorosubstituted acyloins and 1,2-diketones have many varied uses. For instance, the polyfluorosubstituted 1,2-diketones are useful as polymerization photoinitiators, i.e., as materials which, when combined with an addition polymerizable, ethylenically unsaturated monomer, will activate the mixture so that, when the mixture is exposed to light, generally of 1800 to 7000 A., the polyfluorinated 1,2-diketones decompose under the influence of said light to form active free radicals which initiate the polymerization of the ethylenically unsaturated monomer (see, for instance, U.S. Patent 2,367,660, where a similar polymerization initiation action is described for the corresponding hydrocarbon compound). By virtue of the high content of fluorine-to-carbon links, these polyfluorosubstituted 1,2-diketones are stabler than their corresponding hydrocarbon compounds and also have a greater affinity for, and accordingly a higher utility in, the polymerization under light-induced conditions of the polyfluorosubstituted ethylenically unsaturated monomers. In like manner, the polyfluorosubstituted acyloins serve similarly as photoinitiators for ethylenically unsaturated monomers, again particularly for the polyfluorosubstituted ethylenic monomers (see, for instance, U.S. Patent 2,367,661, where a similar initiating activity is described for the corresponding hydrocarbyl acyloins).

The polyfluorosubstituted 1,2-diketones are also useful in an entirely different sense in the polymerization field in that they are polymerizable comonomers for the ethylenically saturated oxo- or thiocarbonyl-containing addition polymerizable monomers. More specifically, the perfluoro-4,5-octanedione of Example IV can be copolymerized with thiocarbonyl difluoride to form an elastomeric copolymer containing two combined mole percent of the perfluoro-4,5-octanedione and 98 combined mole percent of the thiocarbonyl difluoride. The copolymer is somewhat nervier than the thiocarbonyl difluoride homopolymer.

The longer chain acyloins and 1,2-diketones are also useful as surfactants, i.e., dispersing agents, particularly for waxes, oils, and greases, and especially for the polyfluorinated low molecular weight polymers.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the group consisting of

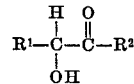

and

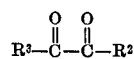

wherein:

$R^1$ and $R^2$ are selected from the group consisting of perfluoro-, ω-hydroperfluoro- and ω-chloroperfluoroalkyl of 3–14 carbons; and $R^3$ is selected from the group consisting of perfluoro-, ω-hydroperfluoro-, ω-chloroperfluoro-, α-hydroperfluoro-, α,ω-dihydroperfluoro- and α-hydro-ω-chloroperfluoroalkyl of 3–14 carbons.

2. 5H-tetradecafluoro-5-hydroxy-4-octanone.
3. 1H,6H,10H-hexadecafluoro-6-hydroxy-5-decanone.
4. Perfluoro-4,5-octanedione.
5. 3H-tridecafluoro-4,5-octanedione.
6. 1H,4H,10H-pentadecafluoro-5,6-decanedione.
7. The process of producing a dione of the formula

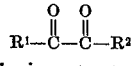

which comprises pyrolyzing at a temperature in the range 400–700° C., a diester of the formula

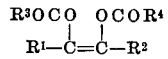

$R^1$, $R^2$, $R^3$ and $R^4$ being selected from the group consisting of perfluoro-, ω-hydroperfluoro-, and ω-chloroperfluoroalkyl radicals of 3–14 carbons.

8. The process of producing perfluoro-4,5-octanedione which comprises pyrolyzing at a temperature in the range 400 – 700° C., perfluoro - 4 - octene-4,5-diol diperfluorobutyrate.

References Cited by the Examiner

UNITED STATES PATENTS 3,055,913    9/1962    Moore et al.

OTHER REFERENCES

Rausch et al.: J. Org. Chem., vol. 21, pp. 1328–30 (1956).

References Cited by the Applicant

"Identification of Organic Compounds," 3rd edition, John Wiley & Sons, Inc., 1948, p. 115.

LEON ZITVER, *Primary Examiner.*

CHARLES B. PARKER, *Examiner.*